(12) United States Patent
Hayashi et al.

(10) Patent No.: US 8,143,327 B2
(45) Date of Patent: Mar. 27, 2012

(54) METHOD FOR PRODUCING CORE-SHELL FINE PARTICLE AND METHOD FOR PRODUCING INTERMEDIATE WHICH IS USED FOR PRODUCTION OF THE CORE-SHELL FINE PARTICLE

(75) Inventors: Masaki Hayashi, Aichi-ken (JP); Masumi Takamura, Aichi-ken (JP)

(73) Assignee: NOF Corporation, Tokyo (JP)

( * ) Notice: Subject to any disclaimer, the term of this patent is extended or adjusted under 35 U.S.C. 154(b) by 266 days.

(21) Appl. No.: 12/525,528

(22) PCT Filed: Apr. 15, 2008

(86) PCT No.: PCT/JP2008/057348
§ 371 (c)(1),
(2), (4) Date: Jul. 31, 2009

(87) PCT Pub. No.: WO2008/133110
PCT Pub. Date: Nov. 6, 2008

(65) Prior Publication Data
US 2010/0036055 A1 Feb. 11, 2010

(30) Foreign Application Priority Data
Apr. 25, 2007 (JP) ................. 2007-115602

(51) Int. Cl.
*C08F 2/22* (2006.01)
*C08F 257/00* (2006.01)
*C08L 51/00* (2006.01)

(52) U.S. Cl. ........ 523/201; 525/243; 525/245; 525/247; 525/259

(58) Field of Classification Search ........... 523/201; 525/209, 243, 245, 247, 259
See application file for complete search history.

(56) References Cited

U.S. PATENT DOCUMENTS

| | | | | |
|---|---|---|---|---|
| 5,292,814 A | * | 3/1994 | Bayer et al. | 525/243 |
| 2005/0245624 A1 | * | 11/2005 | Busson et al. | 521/50 |
| 2007/0265390 A1 | * | 11/2007 | Jorgedal et al. | 524/800 |
| 2008/0233451 A1 | * | 9/2008 | Hong et al. | 429/33 |

FOREIGN PATENT DOCUMENTS

| | | |
|---|---|---|
| JP | 2002-363205 A | 12/2002 |
| JP | 2004-018556 A | 1/2004 |

OTHER PUBLICATIONS

Shinya et al, elecronic translation of JP 2002-363205 (Dec. 2002).*
Park et al., Colloids and Surfaces A: Physicochemical and Engineering Aspects 191 p. 193-199 (2001).*

* cited by examiner

*Primary Examiner* — Jeffrey Mullis
(74) *Attorney, Agent, or Firm* — Seager, Tufte & Wickhem LLC

(57) ABSTRACT

A core-shell fine particle (10) is produced as follows. First of all, a monomer mixture containing 15-99% by mass of a crosslinkable monomer and 1-85% by mass of a monomer having an ATRP initiating group is adsorbed into an organic monodispersed seed particle. Next, the monomer mixture is polymerized by a polymerization initiator, thereby forming a core layer composed of a monodispersed crosslinked fine particle (11) containing an ATRP initiating group (12). A shell layer (13) is then formed by graft polymerizing a monomer onto the thus-obtained core layer.

9 Claims, 1 Drawing Sheet

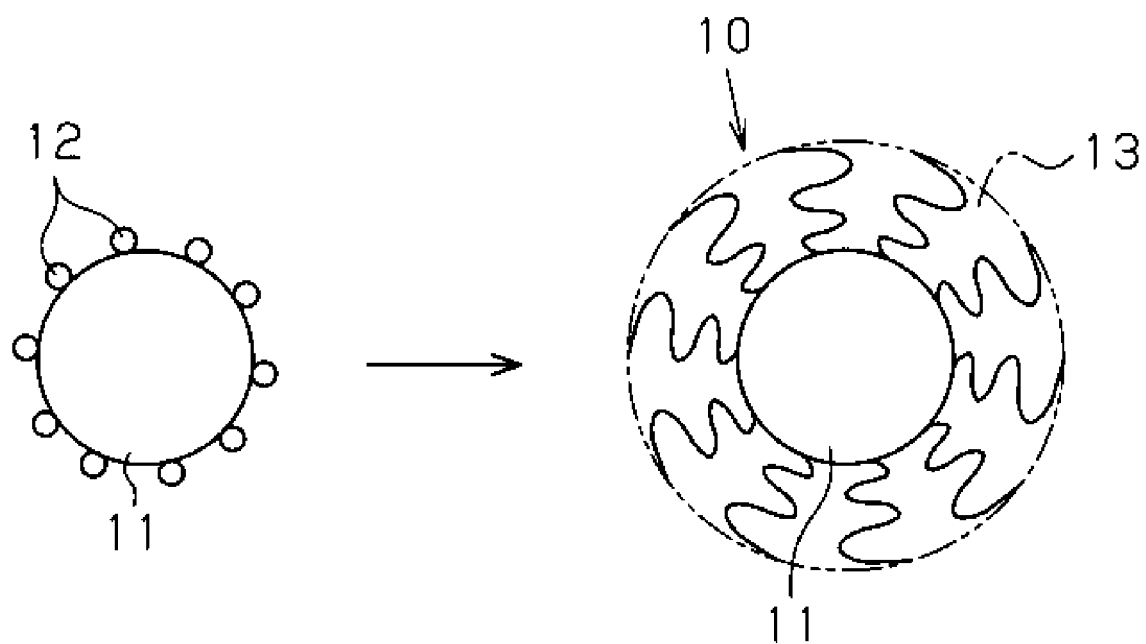

METHOD FOR PRODUCING CORE-SHELL FINE PARTICLE AND METHOD FOR PRODUCING INTERMEDIATE WHICH IS USED FOR PRODUCTION OF THE CORE-SHELL FINE PARTICLE

TECHNICAL FIELD

The present invention relates to a method for producing a core-shell fine particle having a core-shell structure, which has a core layer formed of monodispersed crosslinked fine particles containing atom transfer radical polymerization initiating group and a shell layer formed by graft polymerization of a monomer onto the core layer, and relates to a method for producing an intermediate for use in producing the core-shell fine particle.

BACKGROUND ART

Various types of polymer fine particles have been developed and used in a wide variety of fields. As the size of polymer fine particles decreases, they become easily aggregated. For the reason, polymer fine particles having a manageable size on the order of micron or more have been often used. However, with the recent progress in nanotechnology, new uses of small-size polymer fine particles have been developed. For example, for submicron-size fine particles within the wavelength of visible light, new uses have been developed taking advantage of optical characteristics such as dispersion and interference. Submicron fine particles are three-dimensionally closely packed to form a colloidal crystal and use of the colloidal crystal has been developed. To form such a colloidal crystal, monodispersed fine particles having a narrow particle size distribution are demanded.

On the other hand, among the polymer fine particles, a core-shell fine particle, in which not less than two types of polymers are combined, has attracted attention as a functional composite fine particle. The core-shell fine particle has a structure, which has a core layer (core fine particle) and a shell layer. The shell layer is formed of sufficiently dense polymer chains. One end of each of the polymer chains forming the shell layer is fixed on the surface of the core layer. Among the methods for producing a core-shell fine particle, in particular, one of the living radical polymerization methods, namely, atom transfer radical polymerization (ATRP), has recently attracted attention since a graft chain can be formed densely on the surface of a polymer fine particle. The graft chain densely provided also contributes to suppressing aggregation of a core-shell fine particle due to its sterical repulsion.

Patent Document 1 discloses a method for producing a core-shell fine particle by producing a fine particle containing an ATRP initiating group by precipitation-polymerization of a monomer having the ATRP initiating group with divinyl benzene in an organic solvent (acetonitrile solvent) and subsequently subjecting the produced fine particle to graft polymerization.

Patent Document 1: Japanese Laid-Open Patent Publication No. 2004-18556 (page 2, 4 and 5)

SUMMARY OF THE INVENTION

The production method of Patent Document 1 can produce monodispersed fine particles having a high crosslink density and containing an ATRP initiating group. However, the average particle size of the fine particles is 2 to 5 µm (see Examples 1 to 4). The production method of Patent Document 1 cannot produce monodispersed submicron-size fine particles.

A soap-free emulsion polymerization method is effective to obtain monodispersed submicron-size fine particles. However, fine particles having only a low degree of crosslinking is produced by the soap-free emulsion polymerization method. In the case where a crosslinkable monomer is contained in an amount of not less than 10% by mass, a large amount of aggregates is produced in the soap-free emulsion polymerization method, with the result that the productivity of the fine particles decreases. Furthermore, when a fine particle of a low crosslink density is used as a core fine particle and a shell layer is formed on the surface of the core fine particle by graft polymerization, the core fine particle is swollen by the monomer forming the shell layer and polymerization proceeds also within the core fine particle. As a result, the particle size of the core-shell fine particle becomes larger than a desired particle size. Since a part of the shell layer invades into the core fine particle in this way, neither core fine particle nor shell layer can simultaneously or synergetically fulfill their primary functions. Therefore, conventional core-shell fine particles are functionally insufficient composite fine particles.

Accordingly, the present invention is directed to provide a method for producing a core-shell fine particle having a submicron size and capable of substantially preventing the swelling of the core layer, thereby permitting the core layer and the shell layer to sufficiently fulfill their primary functions. The present invention is further directed to provide a method for producing monodispersed crosslinked fine particles containing an ATRP initiating group, in which fine particles of a high crosslink density uniform in particle size containing an ATRP initiating group can be obtained by a simple method.

To attain the aforementioned object, a method for producing a core-shell fine particle according to a first aspect of the present invention is characterized by allowing a monomer mixture to be absorbed in organic monodispersed seed particles dispersed in an aqueous medium, the monomer mixture containing 15 to 99% by mass of a crosslinkable monomer having a plurality of vinyl groups and 1 to 85% by mass of a monomer having an atom transfer radical polymerization initiating group; polymerizing the monomer mixture using a polymerization initiator, thereby producing a core layer composed of monodispersed crosslinked fine particles containing the atom transfer radical polymerization initiating group; and performing graft-polymerization of a monomer onto the resulting core layer to form a shell layer.

A method for producing monodispersed crosslinked fine particles containing atom transfer radical polymerization initiating groups according to a second aspect is characterized by allowing a monomer mixture to be absorbed in organic monodispersed seed particles dispersed in an aqueous medium, the monomer mixture containing 15 to 99% by mass of a crosslinkable monomer having a plurality of vinyl groups and 1 to 85% by mass of a monomer having an atom transfer radical polymerization initiating group; and polymerizing the monomer mixture using a polymerization initiator to produce monodispersed crosslinked fine particles containing the atom transfer radical polymerization initiating group.

A method for producing monodispersed crosslinked fine particles containing atom transfer radical polymerization initiating groups according to a third aspect is characterized in that the monomer having the atom transfer radical polymerization initiating group in the second aspect is a compound represented by the following general formula (1):

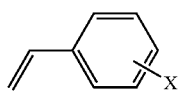
(1)

where X is an atom transfer radical polymerization initiating group.

A method for producing monodispersed crosslinked fine particles containing atom transfer radical polymerization initiating groups according to a fourth aspect is characterized in that the atom transfer radical polymerization initiating group X in the second or third aspect is a functional group represented by any one of the following general formulas (2) to (4).

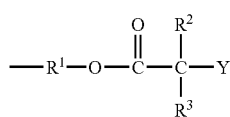
(2)

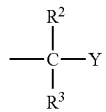
(3)

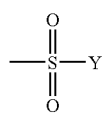
(4)

where $R^1$ is an alkylene group having 1 to 4 carbon atoms or $R^1$ may not be present; $R^2$ and $R^3$ each independently represent a hydrogen atom, an alkyl group having 1 to 8 carbon atoms, an aryl group having 6 to 8 carbon atoms; an alkylaryl group having 6 to 8 carbon atoms; and Y is a halogen atom.

A method for producing monodispersed crosslinked fine particles containing atom transfer radical polymerization initiating groups according to a fifth aspect is characterized in that the monodispersed crosslinked fine particles containing atom transfer radical polymerization initiating groups in the second or third aspect have an average particle size (measured by dynamic light scattering) of 50 to 900 nm and have a CV value (representing the percentage of a particle size standard deviation to the average particle size) of 20% or less.

According to embodiments of the present invention, the following effects can be produced.

The method for producing a core-shell fine particle according to the first aspect is performed by graft polymerization of a monomer onto a core layer formed of monodispersed crosslinked fine particles containing atom transfer radical polymerization initiating groups to form a shell layer. In this case, as the monomer, a monomer mixture, which contains 15 to 99% by mass of a crosslinkable monomer and 1 to 85% by mass of a monomer having an atom transfer radical polymerization initiating group, is used. Since the content of the crosslinkable monomer is as sufficient as not less than 15% by mass and the crosslink density of the monodispersed crosslinked fine particles is high, invasion of the monomer into the crosslinked fine particles is suppressed. Accordingly, if the size of the organic monodispersed seed particles is set at a predetermined submicron size, its size can be maintained. As a result, in producing the shell layer, the core layer does not swell and the size of the order of submicron can be ensured; at the same time, the core layer and the shell layer can simultaneously or synergetically fulfill their primary functions. As a result, the function as a functional composite fine particle can be sufficiently fulfilled.

The method for producing monodispersed crosslinked fine particles according to the second aspect is performed by allowing a monomer mixture to be absorbed in organic monodispersed seed particles dispersed in an aqueous medium, the monomer mixture containing 15 to 99% by mass of a crosslinkable monomer having a plurality of vinyl groups and 1 to 85% by mass of a monomer having an atom transfer radical polymerization initiating group; and polymerizing the monomer mixture using a polymerization initiator. In this case, if polymerization is performed by previously preparing the organic monodispersed seed particles having a uniform submicron particle size; at the same time, increasing the amount of crosslinkable monomer, the particle size, distribution and crosslink density of the monodispersed crosslinked fine particles can be easily set. Therefore, fine particles containing atom transfer radical polymerization initiating groups and having a uniform submicron particle size and a high crosslink density can be obtained by a simple method.

In the method for producing monodispersed crosslinked fine particles according to the third aspect, since the monomer having an atom transfer radical polymerization initiating group is a monomer represented by the above general formula (1), the atom transfer radical polymerization initiating group can be efficiently introduced into the fine particles due to its feature, in addition to the effect of the second aspect.

In the method for producing monodispersed crosslinked fine particles according to the fourth aspect, since the monomer having an atom transfer radical polymerization initiating group is a monomer represented by any one of the above general formulas (2) to (4), the shell layer can be further efficiently formed, in addition to the effects of the second and third aspects.

In the method for producing monodispersed crosslinked fine particles according to the fifth aspect, the monodispersed crosslinked fine particles containing atom transfer radical polymerization initiating groups have an average particle size (measured by dynamic light scattering) of 50 to 900 nm and have a CV value (representing the percentage of a particle size standard deviation to the average particle size) of 20% or less. For this reason, the crosslinked fine particles are monodispersed crosslinked fine particles formed on the order of submicron and having a narrow particle size distribution, in addition to the effects according to any one of the second to fourth aspects.

BRIEF DESCRIPTION OF THE DRAWINGS

FIG. 1 shows schematic views of a monodispersed crosslinked fine particle containing ATRP initiating groups and a core-shell fine particle.

DETAILED DESCRIPTION OF THE PREFERRED EMBODIMENT

The embodiments of the present invention will be more specifically described below.

In the method for producing a core-shell fine particle according to an embodiment of the invention, the core-shell fine particle is produced by graft-polymerization of a monomer onto a monodispersed crosslinked fine particle (hereinafter simply referred to as a "crosslinked fine particle") containing an ATRP initiating group and serving as an intermediate. More specifically, when the graft polymerization of the monomer is initiated from the ATRP initiating group of the crosslinked fine particle, the monomer is grafted onto the crosslinked fine particle serving as a core layer and grown into a polymer chain, which forms a shell layer in the peripheral portion of the core layer. The atom transfer radical polymerization (ATRP) used herein, which is a kind of living radical polymerization, is chain-growth polymerization in which a chain is primarily polymerized without chain transfer and chain termination. It is easy to adjust the structure of a polymer chain and the molecular-weight distribution of a polymer can be narrowed (monodispersed).

As shown in FIG. 1, a core-shell fine particle 10 having a core-shell structure is produced from a crosslinked fine particle 11. In the outer peripheral surface of the crosslinked fine particle 11, a plurality of numbers of ATRP initiating groups 12 are densely arranged and exposed. The core-shell fine particle 10 has a core composed of the crosslinked fine particle 11 and a shell layer 13 formed by graft polymerization of a monomer onto the crosslinked fine particle 11. When a monomer mixture is blended to the crosslinked fine particle 11 and polymerized, the monomer mixture is grafted to the outer peripheral surface of the crosslinked fine particle 11, in particular, the sites (also referred to as an ATRP initiation site) of an ATRP initiating group 12 and grown in the radius direction to form the shell layer 13. In the resultant graft copolymer, the core layer corresponds to a stem component and the shell layer 13 corresponds to a branch component.

The method for producing the crosslinked fine particle will be described more specifically. In this method, first, organic monodispersed seed particles are dispersed in an aqueous medium to prepare a particle dispersion solution. The particle dispersion solution is allowed to absorb (impregnated with) a monomer mixture, which contains 15 to 99% by mass of a crosslinkable monomer having a plurality of vinyl groups and 1 to 85% by mass of a monomer having an ATRP initiating group, and polymerization of the monomer mixture is performed using a polymerization initiator. In this case, other than the crosslinkable monomer and the monomer containing an ATRP initiating group mentioned above, other types of monomers can be blended with the monomer mixture if necessary.

Organic monodispersed seed particles (hereinafter also referred to simply as the "seed particle(s)") will be described. The seed particle serves as a base body for forming the core layer of a core-shell fine particle. As the seed particles, organic polymer particles having a narrow particle size distribution are used. As the average particle size of the seed particles is appropriately selected depending upon the average particle size of the crosslinked fine particles to be desired. Usually, the average particle size measured by dynamic light scattering is 10 to 800 nm, and preferably 30 to 700 nm. The particle size distribution of the seed particles is represented by a CV value, namely, CV value=(particle size standard deviation/average particle size)×100.

The CV value is preferably 20% or less, and more preferably 15% or less. If the CV value is set at 20% or less, the particle size distribution can be narrowed and sharpened. The monodispersed particles used herein refer to particles having a narrow particle size distribution, and more specifically, refer to particles having a small CV value within the above numerical range.

As the monomer for forming a seed particle, styrene, butadiene, (meth)acrylate etc. may be mentioned. As a polymer constituting the seed particle, styrene copolymers such as a styrene polymer, a styrene-butadiene copolymer and a styrene-(meth)acrylate copolymer; and (meth)acrylate polymers and copolymers such as a methyl(meth)acrylate polymer may be mentioned. These polymers are preferably polymers capable of sufficiently absorbing a monomer and appropriately selected. Furthermore, these polymers are preferably non-crosslinked particles or slightly crosslinked particles polymerized by blending a crosslinkable monomer having a plurality of vinyl groups such as divinyl benzene in an amount of not more than 10% by mass, and further preferably not more than 2% by mass. When the crosslinkable monomer is contained in an amount larger than 10% by mass, the monomer mixture is rarely absorbed.

As a polymerization method for producing a seed particle, a known polymerization method such as a soap-free emulsion polymerization method, a dispersion polymerization method, a suspension polymerization method and an emulsion polymerization method is applicable; however, the polymerization method is not particularly limited. Of them, a soap-free emulsion polymerization method is preferably employed since the surface of particles is clean and the particles exhibit a narrow particle-size distribution, i.e., monodispersion. As the dispersion medium for use in the soap-free emulsion polymerization method for producing seed particles, an aqueous medium is used in order to avoid dissolution of an oil-soluble monomer and a seed particle in a dispersion medium. As the aqueous medium, generally water is used; however, a solution mixture containing water and a small amount of lower alcohol may be used. The particle size of the seed particle can be controlled by varying polymerization temperature, the concentration of a monomer, the amount of polymerization initiator and the amount of reactive emulsifying agent, and so on. For example, the particle size of the seed particle can be reduced by increasing the content of sodium p-styrene sulfonate used as the reactive emulsifying agent.

Next, a method for producing monodispersed crosslinked fine particles (hereinafter simply referred to as a "crosslinked fine particle") containing an ATRP initiating group, will be described. The method for producing the crosslinked fine particles is performed by allowing the seed particle dispersed in an aqueous medium to absorb a monomer mixture, which contains a crosslinkable monomer having a plurality of vinyl groups and a monomer containing an ATRP initiating group, and polymerizing the monomer mixture with a polymer initiator. In this case, other than the crosslinkable monomer and the monomer containing an ATRP initiating group mentioned above, other types of monomers can be blended with the monomer mixture, if necessary.

The monomer mixture contains 15 to 99% by mass of a crosslinkable monomer having a plurality of vinyl groups, preferably 50 to 97%, and more preferably 70 to 95% by mass. When the content of the crosslinkable monomer is less than 15% by mass, the crosslink density of the crosslinked fine particle decreases and mechanical strength becomes insufficient. Furthermore, in producing a core-shell fine particle, the core layer is swollen by a monomer forming the shell layer and polymerization proceeds also within the core layer. As a result, the particle size becomes larger than a desired particle size. In addition, since a monomer constituting the shell layer invades into the core layer, the core-shell fine particle cannot fulfill the function as a functional composite fine particle. On the other hand, when the content of the crosslinkable monomer is larger than 99% by mass, the content of a monomer containing an ATRP initiating group relatively decreases. As a result, the grafting efficiency decreases and a desired shell layer cannot be formed.

As the crosslinkable monomer having a plurality of vinyl groups, a polyfunctional monomer having 2 to 6 vinyl groups is preferred. Examples of the polyfunctional monomer include divinyl benzene, divinylnaphthalene, ethylene glycol di(meth)acrylate, tetraethylene glycol di(meth)acrylate, 1,6- hexanediol di(meth)acrylate, trimethylolpropane tri(meth)acrylate, ditrimethylolpropane tetra(meth)acrylate and dipentaerythritol hexa(meth)acrylate. These crosslinkable monomers may be used singly or in appropriate combination of two types or more.

The monomer mixture contains 1 to 85% by mass of a monomer containing an ATRP initiating group, preferably 3 to 50% by mass, and more preferably 5 to 30% by mass. When the content of the monomer is less than 1% by mass, the grafting density becomes excessively low in producing a core-shell fine particle. As a result, the effect as functional composite fine particle cannot be exerted. On the other hand, when the content of the monomer exceeds 85% by mass, the content of the crosslinkable monomer relatively reduces. As a result, the crosslink density of the crosslinked fine particle decreases.

As the monomer containing an ATRP initiating group, a known compound can be used; however, a compound represented by the following general formula (1) is preferred.

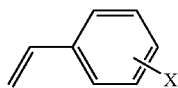

(1)

where X is an atom transfer radical polymerization initiating group and further X is preferably represented by any one of the following general formulas (2) to (4).

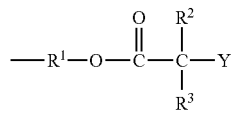

(2)

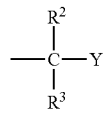

(3)

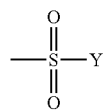

(4)

where $R^1$ is an alkylene group having 1 to 4 carbon atoms or $R^1$ may not be present: $R^2$ and $R^3$ each independently represent a hydrogen atom, an alkyl group having 1 to 8 carbon atoms, an aryl group having 6 to 8 carbon atoms; an alkylaryl group having 6 to 8 carbon atoms; and Y is a halogen atom.

The monomer containing an ATRP initiating group can be easily obtained in accordance with a customary method. Specific examples of the monomer containing an ATRP initiating group include 2-bromoisobutyric acid-4-vinylphenyl ester, 1-(1-bromoethyl)-4-vinylbenzene and 4-vinylbenzene sulfonyl chloride. These monomers containing an ATRP initiating group may be used singly or in appropriate combination of two types or more.

The content of the monomer mixture is preferably 50 to 2000 parts by mass relative to 100 parts by mass of the seed particles. When the content is less than 50 parts by mass, the amount of crosslinking component decreases. As a result, the mechanical strength of crosslinked fine particles becomes insufficient; at the same time, the content of an ATRP initiating group reduces. On the other hand, when the content is larger than 2000 parts by mass, the particle size distribution of the crosslinked fine particles becomes broad and the generation amount of aggregations increases.

The other types of monomers mentioned above can be blended with the monomer mixture in order to impart functions as long as physical properties of crosslinked fine particles, such as mechanical strength, are not substantially impaired. Example of the other types of monomers include styrene monomers such as styrene, p-methylstyrene, α-methylstyrene, 2-vinylnaphtharene, p-methoxystyrene and ethylvinylbenzene; (meth)acrylate monomers such as methyl(meth)acrylate, ethyl(meth)acrylate, butyl(meth)acrylate, 2-ethylhexyl(meth)acrylate, cyclohexyl(meth)acrylate, 2-hydroxyethyl(meth)acrylate, glycidyl(meth)acrylate, ethoxydiethylene glycol(meth)acrylate, methoxytriethylene glycol(meth)acrylate and methoxypropylene glycol(meth)acrylate; monomers of an unsaturated carboxylic acid such as (meth)acrylic acid and crotonic acid; monomers of an unsaturated dicarboxylic acid such as maleic acid, fumaric acid and itaconic acid; monomers of acid anhydride such as maleic anhydride and itaconic anhydride; monomers of fumarate such as dimethyl fumarate and dicyclohexyl fumarate; isocyanate group-containing monomers such as (meth)acrylic acid-2-isocyanate ethyl (monomer) and m-isopropenyl-α,α-dimethylbenzyl isocyanate (monomer); nitrogen-containing alkyl(meth)acrylates such as N,N-dimethylaminoethyl(meth)acrylate and N-t-butylaminoethyl(meth)acrylate; amide group-containing monomers such as acrylamide, N,N-dimethyl(meth)acrylamide and N-isopropyl acrylamide; and aromatic group-containing nitrogen monomers such as 2-vinylpyridine and 4-vinylpyridine; monomers of conjugated diene such as butadiene, isoprene and chloroprene; monomers of vinyl ester such as vinyl acetate; vinyl pyrrolidone, vinyl carbazole and acrylonitrile. Furthermore, as the other types of monomers, functional monomers such as water-soluble monomers, ionic monomers and functional group-containing monomers may be used, if necessary. Of them, a styrene monomer or a (meth)acrylate monomer is preferably used. Furthermore, the monomers may be used singly or in combination with two or more types.

The content of the other types of monomers is preferably not more than 500 parts by mass based on the sum (100 parts by mass) of a crosslinkable monomer and a monomer containing an ATRP initiating group, more preferably 5 to 300 parts by mass, and particularly preferably 10 to 200 parts by mass. In this case, the content of the crosslinkable monomer in the sum of the crosslinkable monomer, the monomer containing an ATRP initiating group and the other types of monomers is preferably not less than 15% by mass, and the content of the monomer containing an ATRP initiating group is preferably not less than 1% by mass. When the content of the other types of monomers exceeds 500 parts by mass, the content of the crosslinkable monomer or the monomer containing an ATRP initiating group relatively decrease. As a result, the crosslink density of the crosslinked fine particles decreases and initiation of living radical polymerization is delayed.

Polymerization of the monomer mixture to obtain crosslinked fine particles is performed by allowing the above seed particles to absorb the monomer mixture and reacting in the presence of a polymerization initiator. The polymerization is carried out generally by blending seed particles, a monomer mixture and a polymerization initiator with an aqueous medium. First, the monomer mixture is added to a suspension solution of the seed particles to be absorbed. Alternatively, the monomer mixture is previously dispersed in an aqueous medium. To this, the suspension solution of the seed particles is added. In this manner, absorption may be performed. As the addition manner, any one of simultaneous addition, stepwise addition and continuous addition may be employed. The addition manner is not particularly limited.

As a polymerization initiator to be used in polymerizing the monomer mixture, a known radical polymerization initiator, more specifically, known oil-soluble polymerization initiator or a known water-soluble polymerization initiator can be used. As the oil-soluble polymerization initiator, for example, organic peroxides such as benzoyl peroxide, lauroyl peroxide, t-butylperoxy-2-ethyl hexanoate, diisopropylperoxydicarbonate and 1,1-bis(t-butylperoxy)cyclohexane; and azo compounds such as 2,2'-azobisisobutyronitrile and 2,2'-azobis(2,4-dimethylvaleronitrile) may be mentioned. As the water-soluble polymerization initiator, for example, persulfates such as potassium persulfate and ammonium persulfate, 4,4'-azobis-4-valerate and 2,2'-azobis-2-aminodinopropane hydrochloride may be mentioned.

An oil-soluble polymerization initiator can be used by dissolving the oil-soluble polymerization initiator in the monomer mixture. A water-soluble polymerization initiator can be used by dissolving the water-soluble polymerization initiator in an aqueous medium. The content of these polymerization initiators is appropriately set depending upon the type of monomer mixture and the polymerization temperature; however, it is usually 0.01 to 10 parts by mass relative to 100 parts by mass of the monomer mixture, and preferably 0.1 to 5 parts by mass.

Furthermore, if necessary, an emulsifying agent or a dispersion stabilizer may be blended. As the emulsifying agent, alkylbenzene sulfonates such as sodium dodecyl benzene sulfonate, sulfates such as sodium tetradecyl sulfate, fatty acid salts such as sodium laurate, and polyethylene glycol alkyl ethers such as polyethylene glycol nonylphenyl ether, etc. may be mentioned. These emulsifying agents may be used singly or in combination with two or more types. As the dispersion stabilizer, polyvinylpyrrolidone, polyvinyl alcohol, partly-saponified polyvinyl alcohol, methylcellulose, polyacrylic acid, polyacrylate copolymer, neutralized products of these and polymethacrylic acid, polymethacylate copolymers and neutralized products of these, etc. may be mentioned. These dispersion stabilizers may be used singly or in combination with two types or more.

Polymerization conditions of a monomer mixture can be appropriately selected depending upon the type of monomer, etc.; however, generally it is preferred that polymerization is performed under stirring at a polymerization temperature of 30 to 90° C. for a polymerization time of 3 to 48 hours. The polymerized fine particles are centrifugally separated or salted out and filtrated. After the water layer is removed, the resultant substance is washed with water and an organic solvent, dried, purified and isolated.

The crosslinked fine particles thus obtained have an average particle size (measured by dynamic light scattering in a good solvent) of preferably 50 to 900 nm, and further preferably 80 to 800 nm. When the average particle size is set within the above range, the size of the crosslinked fine particles can be set on the order of submicron (0.1 μm order). When the average particle size is less than 50 nm, it becomes difficult to produce crosslinked fine particles. On the other hand, when the average particle size exceeds 900 nm, the size of the crosslinked fine particles becomes the order of micron (1 μm order). As a result, optical characteristics such as light scattering and interference cannot be sufficiently obtained.

Furthermore, the CV value of the crosslinked fine particles is preferably 20% or less, and further preferably 15% or less. The lower limit of the CV value is 0 in the ultimate case where the particles of a uniform size are monodispersed. When the CV value of the crosslinked fine particles is set at 20% or less, the particle size distribution of the crosslinked fine particles can be narrowed and the characteristics of the core-shell fine particles can be improved. When the CV value exceeds 20%, the crosslinked fine particles have a broad size distribution. As a result, the characteristics of the core-shell fine particles are poorly expressed or become unstable. In addition, the crosslinked fine particles in which a crosslinked structure is densely formed and therefore exhibits extremely good solvent resistance. Accordingly, the crosslinked fine particles are formed of a monomer such as styrene and methyl methacrylate and are not dissolved or deformed in organic solvents such as toluene, tetrahydrofuran, acetone and dichloromethane. In addition, the crosslinked fine particles are swollen but extremely slightly in an organic solvent. Therefore, both core layer and shell layer can simultaneously or synergetically fulfill their primary functions.

Next, a method for producing a core-shell fine particle will be described. In the method, graft-polymerization of a monomer is performed with an ATRP initiating group present on the outer peripheral surface of the above crosslinked fine particle. By the graft polymerization, a shell layer is formed in the outer periphery of a core layer. In this way, graft copolymer particles having a core-shell structure, in short, core-shell fine particles can be obtained. Since graft polymerization based on ATRP is employed, there are few limitations in type of monomer. As a result, core-shell fine particles having excellent monodispersibility, i.e., a narrow molecular-weight distribution, can be obtained.

The monomer to be used for producing a core-shell fine particle can be appropriately selected from the aforementioned other types of monomers for use in producing a crosslinked fine particle, depending upon the physical properties required for the core-shell fine particle. However, it is preferred to select a different monomer for the core layer from that for the shell layer in order to allow the core-shell fine particle to serve as a functional composite fine particle. The content of the monomer is appropriately set depending upon the desired molecular weight of the shell layer; however, it is usually 10 to 10000 parts by mass relative to 100 parts by mass of a crosslinked fine particle, and more preferably 100 to 2000 parts by mass.

In the graft polymerization, in order to facilitate the graft polymerization, a transition metal complex is added as a catalyst. The transition metal complex can be represented by the following general formula:

$$MZ(D)$$

where M is a transition metal; Z is a halogen atom; and (D) represents a ligand.

M is not particularly limited as long as M is a transition metal; however, M is preferably a copper atom. Z is a halogen atom such as a fluorine atom, a chlorine atom, a bromine atom and an iodine atom, and preferably a bromine atom. The ligand is not particularly limited as long as it can bind to a transition metal via a coordinate bond; however, the following multidentate ligand is preferred. Examples thereof include 2,2'-bipyridyl, 2,2'-bi-4-heptylpyridyl, 2-(N-pentyliminomethyl)pyridine, sparteine, tris(2-dimethylaminoethyl) amine, 1,1,4,7,7-pentamethyl diethylenetriamine and 1,1,4,7,10,10-hexamethyl triethylenetetramine. The ligand may be used singly or in combination with two types or more.

The transition metal is added so as to obtain a molar ratio of 0.01 to 10 relative to the ATRP initiating group. Further preferable molar ratio is 0.1 to 2. When the molar ratio is less than 0.01, a graft polymerization rate decreases. On the other hand, when the molar ratio exceeds 10, pigmentation by catalyst becomes significant and thus purification of a product is not easily made.

To perform polymerization such that graft chains extend uniformly from the outer peripheral surface of a core layer, and to suppress aggregation of crosslinked fine particles forming the core layer, non-vinyl type ATRP initiator may be added, if necessary. In this case, graft polymerization can be uniformly performed without excessively adding the crosslinked fine particle containing an ATRP initiating group. Examples of such an ATRP initiator may include 1-bromophenylethane, phenyl 2-bromoisobutyrate and p-toluene sulfonate chloride.

As the polymerization method, a known polymerization method may be employed which includes a mass polymerization method, a suspension polymerization method, a solution polymerization method and an emulsion polymerization method, and is appropriately selected depending upon the type of monomer, the polymerization temperature and the desired molecular weight, etc. For example, when a solution polymerization method is employed, a monomer for forming a shell layer and a solvent for dissolving a polymer thereof are selected. Examples of such a solvent may include aromatic hydrocarbon solvents such as toluene and xylene; ketone solvents such as methylethyl ketone and isobutyl ketone; ester solvents such as butyl acetate; alcohol solvents such as methanol and butyl alcohol; ethylene glycol solvents such as ethylene glycol, ethylene glycol monomethyl ether and ethylene glycol monomethyl ether acetate; diethylene glycol solvents such as diethylene glycol and diethylene glycol dimethyl ether; propylene glycol solvents such as propylene glycol and propylene glycol methyl ether acetate; and nitrogen or sulfur containing organic compounds such as N,N-dimethyl formamide, acetonitrile and dimethyl sulfoxide. These solvents may be used singly or as a mixture.

The polymerization temperature for producing a core-shell fine particle is preferably 20 to 120° C., and further preferably 40 to 90° C. When the polymerization temperature is less than 20° C., a polymerization rate decreases, with the result that the polymerization time increases. On the other hand, when the polymerization temperature is higher than 120° C., it is difficult to control the polymerization rate. In addition, polymerization from the outer peripheral surface of a crosslinked fine particle does not proceed uniformly, with the result that the density of a graft polymer decreases. After polymerization, centrifugal separation is performed to take out fine particles. The fine particles are washed with an organic solvent, if necessary, and dried to obtain core-shell fine particles. The core-shell fine particles obtained by this production method have a spherical or near spherical shape and a uniform submicron particle size.

The core-shell fine particles produced as mentioned above preferably have an average particle size (measured by dynamic light scattering in a good solvent) of 100 to 950 nm. When the average particle size falls within the range, the size of core-shell fine particles can be maintained in the order of submicron (0.1 µm order). When the average particle size is less than 100 nm, strict conditions are required for producing crosslinked fine particles as mentioned above, with the result that core-shell fine particles are not easily obtained. On the other hand, when the average particle size exceeds 950 nm, the core-shell fine particles are obtained on the order of micron (1 µm order) and are not monodispersed. As a result, desired optical characteristics cannot be obtained.

The CV value of the core-shell fine particles is preferably 20% or less, and further preferably 15% or less. The lower limit of the CV value is 0 in the ultimate case where the particles of uniform size are monodispersed. When the CV value of the core-shell fine particles is set at 20% or less, the particle size distribution of the core-shell fine particles can be narrowed and sharpened and the characteristics of core-shell fine particles can be improved. When the CV value exceeds 20%, the core-shell fine particles have a broad size distribution. As a result, the characteristics thereof decrease.

The function and effects obtained in the aforementioned embodiments will be collectively described below:

In the method for producing a core-shell fine particle according to this embodiment, first, seed particles are obtained by polymerizing monomers in an aqueous medium. The seed particles have a submicron size and are monodispersed. Subsequently, the seed particles are allowed to absorb a monomer mixture. The monomer mixture is polymerized using a polymerization initiator to obtain crosslinked fine particles. At this time, when the content of the crosslinkable monomer in the monomer mixture is 15% by mass or more, the crosslink density of the crosslinked fine particle increases, invasion of a monomer into the crosslinked fine particle is suppressed in the graft polymerization. In this manner, the crosslinked fine particle can be maintained in the order of submicron.

Finally, the core-shell fine particle is produced by graft polymerization by blending a monomer with a crosslinked fine particle. At this time, since ATRP initiating groups are present around the outer periphery surface of the crosslinked fine particle, graft polymerization is initiated from the ATRP initiating group. The graft polymerization promptly proceeds to form a shell layer on the outer periphery of the crosslinked fine particle. In this case, since the crosslinked fine particle has a high crosslink density and formed densely, it is difficult for a monomer to invade into the particle. As a result, while the size of the crosslinked fine particle is maintained, a shell layer is formed by graft polymerization of a monomer on the outer periphery of the particle.

Accordingly, if the size of the seed particle is previously set to be on the order of submicron, a crosslinked fine particle is formed while maintaining the size. As a result, when a shell layer is formed, a core-shell fine particle is formed on the order of submicron; at the same time, since the crosslinked fine particle is not swollen, both core layer and shell layer can simultaneously or synergetically fulfill their primary functions. The function as functional composite fine particle can be sufficiently fulfilled. Therefore, the core-shell fine particle can be suitably applied to optical uses.

Furthermore, the method for producing a crosslinked fine particle is performed by allowing the seed particle to absorb a monomer mixture, which contains 15 to 99% by mass of a crosslinkable monomer and 1 to 85% by mass of a monomer having an ATRP initiating group, and polymerizing the monomer mixture using a polymerization initiator. In this case, if a seed particle having a uniform submicron size is previously prepared and polymerization is performed by increasing the amount of crosslinkable monomer, the particle size, distribution and the crosslink density of the crosslinked fine particles can be easily set. Therefore, crosslinked fine particles containing an ATRP initiating group and having a uniform submicron size and a high crosslink density can be obtained by a simple method.

In the method for producing a crosslinked fine particle, if the monomer containing an ATRP initiating group is a monomer represented by the general formula (1) above, the ATRP initiating group can be efficiently introduced into the fine particle based on its characteristics.

Furthermore, in the method for producing a crosslinked fine particle, if the monomer containing an ATRP initiating group is a monomer represented by any one of the general formulas (2) to (4) above, formation of a shell layer can be further efficiently performed.

Moreover, in the method for producing a crosslinked fine particle, the crosslinked fine particles containing an ATRP initiating group have an average particle size (measured by dynamic light scattering) of 50 to 900 nm and a CV value (representing the percentage of a particle size standard deviation to the average particle size) of 20% or less. Accordingly, the crosslinked fine particles according to the embodiment have a submicron size and a narrow particle size distribution (monodispersed crosslinked fine particles).

EXAMPLES

Examples according to the aforementioned embodiments will be described below. However, the description of Examples is not intended to limit the scope of the invention.

First, how to measure an average particle size, CV value, polymerization rate and yield will be described.

(1) Average Particle Size (nm) and CV Value (%)

Fine particles were dispersed in water or tetrahydrofuran (THF). Measurement was performed by dynamic light scattering using a light scattering photometer ELS-8000 (manufactured by Otsuka Electronics Co., Ltd.).

(2) Polymerization Rate (%)

The amount of monomers remaining after polymerization was measured by gas chromatography or liquid chromatography.

(3) Yield (%)

Yield was calculated based on the following expression:

Yield (%)=[amount of polymer recovered (g)/amount of monomer used (g)]×100.

Example 1

Production of Organic Monodispersed Seed Particle (A1)

To a four-neck flask of 500 mL in volume equipped with a condenser tube, a thermometer, a stirrer and a nitrogen inlet pipe, 10.8 g of styrene (St), 0.108 g of 55% (by mass) divinyl benzene (simply referred to as "DVB55") having a purity: 55% by mass and containing 42% by mass of ethyl vinyl benzene, 0.0216 g of sodium p-styrene sulfonate (simply referred to as "NaSS") and ion exchange water (350 g) were added. This was mixed while stirring under nitrogen air flow and heated to 75° C. to prepare a reaction solution. Subsequently, 0.0108 g of potassium persulfate (simply referred to as "KPS") was added to the reaction solution, subjected to a polymerization reaction performed at 75° C. for 7 hours and cooled to room temperature. In this way, a water dispersion solution of the organic monodispersed seed particles (A1) was obtained. The average particle size of the resultant seed particles was 210 nm and the CV value was 9%.

Production of Monodispersed Crosslinked Fine Particle (B1) Containing an ATRP Initiating Group To the above water dispersion solution of organic monodispersed seed particles (A1), 0.325 g of sodium dodecylbenzene sulfonate (DBS) was added and mixed while stirring at room temperature under nitrogen air flow. To this, a monomer mixture, in which 1.08 g of 2-bromoiso butyric acid-4-vinylphenyl ester (compound D1 shown in the following formula (5)) and 0.108 g of 2,2'-azobisisobutyronitrile (AIBN) were dissolved in 9.74 g of DVB55, was gradually added and mixed while stirring at room temperature for one hour. By this operation, the monomer mixture was absorbed by the organic monodispersed seed particles.

Subsequently, the resultant liquid was heated to 75° C., subjected to a polymerization reaction performed at 75° C. for 14 hours and cooled to room temperature. The polymerization rate in the whole polymerizable monomers was 95% or more. Aggregates were filtered off by a nylon mesh to obtain a fine particle dispersion solution. The fine particle dispersion solution was salted out, filtrated, washed with water and methanol and dried under reduced pressure to obtain monodispersed crosslinked fine particles (B1) containing an ATRP initiating group. The yield of the monodispersed crosslinked fine particles (B1) was 90% relative to the whole monomers used in production of crosslinked fine particles. The average particle size was 260 nm and the CV value was 11%.

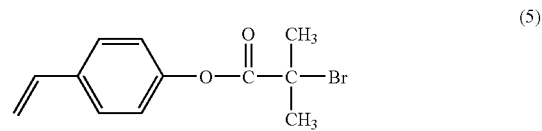

(5)

Example 2

Production of Organic Monodispersed Seed Particle (A2)

To a four-neck flask of 500 mL in volume equipped with a condenser tube, a thermometer, a stirrer and a nitrogen inlet pipe, 25.0 g of St, 0,125 g of DVB55 and 332 g of ion exchange water were added. This was mixed while stirring under nitrogen air flow and heated to 65° C. to prepare a reaction solution. Subsequently, 0.175 g of KPS was added to the reaction solution, subjected to a polymerization reaction performed at 65° C. for 15 hours and cooled to room temperature. In this way, a water dispersion solution of the organic monodispersed seed particles (A2) was obtained. The average particle size of the resultant seed particles (A2) was 403 nm and the CV value was 10%.

Production of Monodispersed Crosslinked Fine Particle (B2) Containing an ATRP Initiating Group To the above water dispersion solution of organic monodispersed seed particles (A2), 0.750 g of DBS was added and mixed while stirring at room temperature under nitrogen air flow. To this, a monomer mixture, in which 1.25 g of 1-(1-bromoethyl)-4-vinyl benzene (compound D2 shown in the following formula (6)), and 0.250 g of AIBN were dissolved in 23.75 g of DVB55, was gradually added and mixed while stirring at room temperature for two hours. By this operation, the monomer mixture was absorbed by the organic monodispersed seed particles (A2). Subsequently, the resultant liquid was heated to 75° C., subjected to a polymerization reaction performed at 75° C. for 15 hours and cooled to room temperature. The polymerization rate in the whole polymerizable monomers was 95% or more. Aggregates were filtered off by a nylon mesh to obtain a fine particle dispersion solution. The fine particle dispersion solution was salted out, filtrated, washed with water and methanol and dried under reduced pressure to obtain monodispersed crosslinked fine particles (B2) containing an ATRP initiating group. The yield of the monodispersed crosslinked fine particles (B2) was 87% relative to the whole monomers used in production of crosslinked fine particles. The average particle size was 403 nm and the CV value was 10%.

(6)

Example 3

Production of Organic Monodispersed Seed Particle (A3)

To a four-neck flask of 500 mL in volume equipped with a condenser tube, a thermometer, a stirrer and a nitrogen inlet pipe, 10.8 g of St, 0.108 g of DVB55, 0.108 g of Nass and 350 g of ion exchange water were added. This was mixed while stirring under nitrogen air flow and heated to 75° C. to prepare a reaction solution. Subsequently, 0.108 g of KPS was added to the reaction solution, subjected to a polymerization reaction performed at 75° C. for 7 hours and cooled to room temperature. In this way, a water dispersion solution of the organic monodispersed seed particles (A3) was obtained. The average particle size of the resultant seed particles (A3) was 128 nm and the CV value was 8%.

Production of Monodispersed Crosslinked Fine Particle (B3) Containing an ATRP Initiating Group To the above water dispersion solution of organic monodispersed seed particles (A3), 0.325 g of DBS was added and mixed while stirring at room temperature under nitrogen air flow. To this, a monomer mixture, in which 3.14 g of compound D2 and 0.108 g of AIBN were dissolved in 7.69 g of divinyl benzene (DVB, purity of 99%), was gradually added and mixed while stirring at room temperature for one hour. By this operation, the monomer mixture was absorbed by the organic monodispersed seed particles. The seed particles were heated to 75° C., subjected to a polymerization reaction performed at 75° C. for 14 hours and cooled to room temperature. The polymerization rate in the whole polymerizable monomers was 95% or more. Aggregates were filtered off by a nylon mesh to obtain a fine particle dispersion solution. The fine particle dispersion solution was salted out, filtrated, washed with water and methanol and dried under reduced pressure to obtain monodispersed crosslinked fine particles (B3) containing an ATRP initiating group. The yield of the monodispersed crosslinked fine particles (33) was 92% relative to the whole monomers used in production of the crosslinked fine particles. The average particle size was 168 nm and the CV value was 8%.

Example 4

Production of Organic Monodispersed Seed Particle (A4)

To a four-neck flask of 500 mL in volume equipped with a condenser tube, a thermometer, a stirrer and a nitrogen inlet pipe, 25.0 g of St, 0.0250 g of DVB55 and 332 g of ion exchange water were added. This was mixed while stirring under nitrogen air flow and heated to 65° C. Subsequently, 0.175 g of potassium persulfate was added to the reaction solution, subjected to a polymerization reaction performed at 65° C. for 15 hours and cooled to room temperature. In this way, a water dispersion solution of the organic monodispersed seed particles (A2) was obtained. The average particle size of the resultant seed particles (A2) was 610 nm and the CV value was 10%.

Production of Monodispersed Crosslinked Fine Particle (B4) Containing an ATRP Initiating Group To the above water dispersion solution of organic monodispersed seed particles (A2), 0.750 g of DBS was added and mixed while stirring at room temperature under nitrogen air flow. To this, a monomer mixture, in which 7.25 g of compound D1, 25.0 g of St and 0.250 g of AIBN were dissolved in 17.75 g of DVB, was gradually added and mixed while stirring at room temperature for two hours. By this operation, the monomer mixture was absorbed by the organic monodispersed seed particles (A2). The seed particles were heated to 75° C., subjected to a polymerization reaction performed at 75° C. for 15 hours and cooled to room temperature. The polymerization rate in the whole polymerizable monomers was 95% or more. Thereafter, aggregates were filtered off by a nylon mesh to obtain a fine particle dispersion solution. The fine particle dispersion solution was salted out, filtrated, washed with water and methanol and dried under reduced pressure to obtain monodispersed crosslinked fine particles (B4) containing an ATRP initiating group. The yield of the monodispersed crosslinked fine particles (B4) was 89% relative to the whole monomers used in production of crosslinked fine particles. The average particle size was 805 nm and the CV value was 11%.

Comparative Example 1

Production of Monodispersed Crosslinked Fine Particle (B5) Containing an ATRP Initiating Group To a four-neck flask of 500 mL in volume equipped with a condenser tube, a thermometer, a stirrer and a nitrogen inlet pipe, 16.15 g of DVB55, 0.850 g of compound D1, 0.340 g of AIBN and 350 g of acetonitrile were added and mixed while stirring under nitrogen air flow and heated to 75° C., subjected to a polymerization reaction performed at 75° C. for 15 hours and cooled to room temperature. The polymerization rate in the whole polymerizable monomers was 95% or more. Aggregates were filtered off by a nylon mesh to obtain a fine particle dispersion solution. The fine particles obtained were filtrated, washed with methanol and dried under reduced pressure to obtain monodispersed crosslinked fine particles (B5) containing an ATRP initiating group. The yield of the monodispersed crosslinked fine particles (B5) was 75% relative to the whole monomers used in production of crosslinked fine particles. The average particle size was 3300 nm and the CV value was 12%.

The results of Examples 1 to 4 and Comparative Example 1 are collectively shown in Table 1. In Table 1, the contents of other components are shown based on 100 parts by mass of styrene in production of seed particles, and based on 100 parts by mass of the sum of a crosslinkable monomer and a monomer containing an ATRP initiating group in production of crosslinked fine particles.

TABLE 1

|  |  | Example 1 | Example 2 | Example 3 | Example 4 | Comparative Example 1 |
|---|---|---|---|---|---|---|
| Seed Particle |  | A1 | A2 | A3 | A4 | — |
| Monomer | St | 100 | 100 | 100 | 100 | — |
| (parts | DVB55 | 1.0 | 0.5 | 1.0 | 0.1 | — |
| by mass) | NaSS | 0.2 | 0.0 | 1.0 | 0.0 | — |
| Ave. Particle Diameter (nm) |  | 210 | 403 | 128 | 610 | — |
| CV value (%) |  | 9 | 10 | 8 | 10 | — |
| Crosslinked Fine Particle |  | B1 | B2 | B3 | B4 | B5 |
| Monomer | DVB55 | 90 | 95 | — | — | 95 |
| (parts | DVB | — | — | 71 | 71 | — |
| by mass) | compound D1 | 10 | — | — | 29 | — |
|  | compound D2 | — | 5 | 29 | — | — |
|  | St | — | — | — | 100 | — |
| Yield (%) |  | 90 | 97 | 92 | 89 | 75 |
| Ave. Particle Diameter (nm) |  | 260 | 510 | 168 | 805 | 3300 |
| CV value (%) |  | 11 | 11 | 8 | 11 | 12 |

From the results of Examples 1 to 4 shown in Table 1, it is clear that monodispersed crosslinked fine particles B1 to B4 containing an ATRP initiating group and having a uniform submicron particle size (168 to 805 nm) with a CV value of 8 to 11% can be obtained. On the other hand, in Comparative Example 1 where particles were produced by precipitation polymerization without using seed particles, the average particle size of the obtained fine particles was on the order of micrometer (3.3 μm).

Example 5

Production of Core-Shell Fine Particle (C1)

N,N-dimethyl formamide ((DMF), 4.76 g), 9.53 g of t-butyl acrylate (t-BA), 0.0452 g of phenyl 2-bromoisobutyrate (Compound E1 shown in the following Formula (7)) and 0.0599 g of 1,1,4,7,10,10-hexamethyl triethylene tetramine (HMTA) were mixed and dissolved. To the mixture, 1.00 g of the fine particles (B1) obtained in Example 1 and 0.0373 g of copper bromide were added, mixed and dispersed by a homogenizer under a nitrogen atmosphere for 30 minutes. The obtained dispersion solution was poured into a glass ampule of 20 mL in content. The ampule was purged with nitrogen and sealed. Polymerization was performed in the airtight ampule at 90° C. for 15 hours. As a result, the polymerization rate was 59.2%. To the content, 15 mL of THF was added and fine particles were separated by a centrifuge. The obtained fine particles were washed with THF three times and dried under reduced pressure to obtain core-shell particles (C1). The average particle size of the obtained core-shell fine particles (C1) was 344 nm and the CV value was 13%.

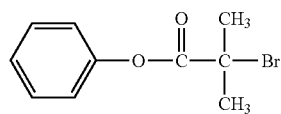

(7)

Example 6

Production of Core-Shell Fine Particle (C2)

DMF (4.66 g), 9.33 g of methoxytriethylene glycol acrylate (MTGA), 0.0344 g of 1-bromo-phenylethane (Compound E2 shown in the following Formula (8)) and 0.0599 g of HMTA were mixed and dissolved. To the mixture, 1.00 g of the fine particles (B2) obtained in Example 2 and 0.0373 g of copper bromide were added, mixed and dispersed by a homogenizer under a nitrogen atmosphere for 30 minutes. The obtained dispersion solution was poured into a glass ampule of 20 mL in content. The ampule was purged with nitrogen and sealed. Polymerization was performed in the airtight ampule at 70° C. for 15 hours. As a result, the polymerization rate was 61.5%. To the content, 15 mL of THF was added and fine particles were separated by a centrifuge. The obtained fine particles were washed with THF three times and dried under reduced pressure to obtain core-shell particles (C2). The average particle size of the obtained core-shell fine particles (C2) was 585 nm and the CV value was 14%.

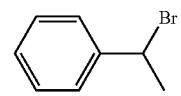

(8)

Example 7

Production of Core-Shell Fine Particle (C3)

Cyclohexanone (4.62 g), 9.24 g of cyclohexyl acrylate, 0.0481 g of Compound E2 and 0.0599 g of HMTA were mixed and dissolved. To the mixture, 1.00 g of the fine particles (B3) obtained in Example 3 and 0.0373 g of copper bromide were added, mixed and dispersed by a homogenizer under a nitrogen atmosphere for 30 minutes. The obtained dispersion solution was poured into a glass ampule of 20 mL in content. The ampule was purged with nitrogen and sealed. Polymerization was performed in the airtight ampule at 70° C. for 15 hours. As a result, the polymerization rate was 68.4%. To the content, 15 mL of THF was added and fine particles were separated by a centrifuge. The obtained fine particles were washed with THF three times and dried under reduced pressure to obtain core-shell particles (C3). The average particle size of the obtained core-shell fine particles (C3) was 274 nm and the CV value was 12%.

Example 8

Production of Core-Shell Fine Particle (C4)

DMF (4.81 g), 8.57 g of t-BA, 1.06 g of glycidyl methacrylate (GMA), 0.0452 g of Compound E1 and 0.0428 g of HMTA were mixed and dissolved. To the mixture, 1.00 g of the fine particles (B4) obtained in Example 4 and 0.0267 g of copper bromide were added, mixed and dispersed by a homogenizer under a nitrogen atmosphere for 30 minutes. The obtained dispersion solution was poured into a glass ampule of 20 mL in content. The ampule was purged with nitrogen and sealed. Polymerization was performed in the airtight ampule at 70° C. for 15 hours. As a result, the polymerization rate of t-BA was 46.0% and the polymerization rate of GMA was 80.4%. To the content, 15 mL of THF was added and fine particles were separated by a centrifuge. The obtained fine particles were washed with THF three times and dried under reduced pressure to obtain core-shell particles (C4). The average particle size of the obtained core-shell fine particles (C4) was 880 nm and the CV value was 13%.

Comparative Example 2

Production of Core-Shell Fine Particle (C5)

DMF (4.76 g), 9.53 g of t-BA, 0.0452 g of Compound E1 and 0.0599 g of HMTA were mixed and dissolved. To the mixture, 1.00 g of the fine particles (B5) obtained in Comparative Example 1 and 0.0373 g of copper bromide were added, mixed and dispersed by a homogenizer under a nitrogen atmosphere for 30 minutes. The obtained dispersion solution was poured into a glass ampule of 20 mL in content. The ampule was purged with nitrogen and sealed. Polymerization was performed in the airtight ampule at 90° C. for 15 hours. As a result, the polymerization rate was 57.3%. To the content, 15 mL of THF was added and fine particles were separated by a centrifuge. The obtained fine particles were washed with THE three times and dried under vacuum to obtain core-shell particles (C5). The average particle size of the obtained core-shell fine particles (C5) was 3370 nm and the CV value was 14%.

From the results shown in Examples 5 to 8, it is clear that monodispersed core-shell fine particles on the order of submicron having a narrow particle size distribution can be obtained. On the other hand, in Comparative Example 2, the core fine particles had a size on the order of μm and fine particles on the order of submicron were not obtained.

Note that the embodiment can be modified and carried out as follows.

A plurality of types of monomers containing an ATRP initiating group are selected and used. In this way, the initiation performance of graft polymerization can be controlled.

As a crosslinkable monomer, a plurality of types of bifunctional monomers having two vinyl groups and multifunctional monomers having three vinyl groups or more are used in combination. In this way, the crosslink density of fine particles to be crosslinked can be controlled.

In producing a core-shell fine particle, a polymerization initiator can be added. In this way, a polymerization rate can be increased.

What is claimed is:
1. A method for producing a core-shell fine particle, the method comprising:
preparing a monomer mixture containing 15 to 99% by mass of a crosslinkable monomer having a plurality of vinyl groups and 1 to 85% by mass of a monomer having an atom transfer radical polymerization initiating group;
allowing the monomer mixture to be absorbed in organic monodispersed seed particles, which are slightly-crosslinked particles that are obtained by polymerization of a crosslinkable monomer having a plurality of vinyl groups added in an amount of not more than 2% by mass, dispersed in an aqueous medium; thereafter
polymerizing the monomer mixture using a polymerization initiator to produce a core layer formed of monodispersed crosslinked fine particles containing atom transfer radical polymerization initiating groups and having an average particle size, measured by dynamic light scattering, of 50 to 900 nm and having a CV value, which represents the percentage of a particle size standard deviation to the average particle size, of 20% or less,
wherein the monomer having the atom transfer radical polymerization initiating group is a compound represented by the following general formula (1):

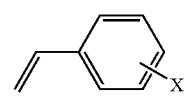

(1)

where X is an atom transfer radical polymerization initiating group represented by any one of the following general formulas (2) to (4):

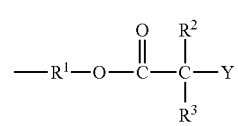

(2)

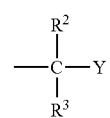

(3)

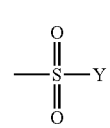

(4)

where:
R$^1$ is an alkylene group having 1 to 4 carbon atoms or R$^1$ may not be present, R$^2$ and R$^3$ each independently represent a hydrogen atom, an alkyl group having 1 to 8 carbon atoms, an aryl group having 6 to 8 carbon atoms, an alkylaryl group having 6 to 8 carbon atoms, in which R$^2$ and R$^3$ in formula (3) are not both hydrogen atoms, and
Y is a halogen atom; and
performing graft polymerization of a monomer onto the resulting core layer to form a shell layer.
2. A method for producing monodispersed crosslinked fine particles containing atom transfer radical polymerization initiating groups, the method comprising:
preparing a monomer mixture containing 15 to 99% by mass of a crosslinkable monomer having a plurality of vinyl groups and 1 to 85% by mass of a monomer having an atom transfer radical polymerization initiating group; and
allowing the monomer mixture to be absorbed in organic monodispersed seed particles, which are slightly-crosslinked particles that are obtained by polymerization of a crosslinkable monomer having a plurality of vinyl groups added in an amount of not more than 2% by mass, dispersed in an aqueous medium; thereafter
polymerizing the monomer mixture using a polymerization initiator to produce monodispersed crosslinked fine particles containing atom transfer radical polymerization initiating groups and having an average particle size, measured by dynamic light scattering, of 50 to 900 nm and having a CV value, which represents the percentage of a particle size standard deviation to the average particle size, of 20% or less,
wherein the monomer having the atom transfer radical polymerization initiating group is a compound represented by the following general formula (1):

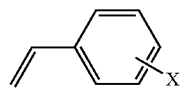
(1)

where X is an atom transfer radical polymerization initiating group represented by any one of the following general formulas (2) to (4):

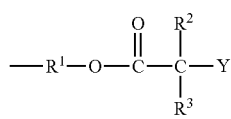
(2)

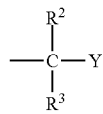
(3)

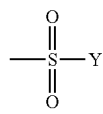
(4)

where:

$R^1$ is an alkylene group having 1 to 4 carbon atoms or $R^1$ may not be present, $R^2$ and $R^3$ each independently represent a hydrogen atom, an alkyl group having 1 to 8 carbon atoms, an aryl group having 6 to 8 carbon atoms, an alkylaryl group having 6 to 8 carbon atoms, in which $R^2$ and $R^3$ in formula (3) are not both hydrogen atoms, and Y is a halogen atom.

3. The method for producing a core-shell fine particle according to claim 1, wherein an average particle size of the organic monodispersed seed particles is 10 to 800 nm and a CV value of the organic monodispersed seed particles is 20% or less.

4. The method for producing a core-shell fine particle according to claim 1, wherein the graft polymerization is performed in the presence of a non-vinyl type atom transfer radical polymerization initiator.

5. The method for producing a core-shell fine particle according to claim 1, wherein the graft polymerization is performed in the presence of a transition metal complex catalyst.

6. The method for producing monodispersed crosslinked fine particles containing the atom transfer radical polymerization initiating group according to claim 2, wherein an average particle size of the seed particles is 10 to 800 nm and a CV value of the seed particles is 20% or less.

7. The method for producing a core-shell fine particle according to claim 1, wherein shell layer is formed of a graft chain radially extending from the atom transfer radical polymerization initiating site of an outer surface of the core layer.

8. The method for producing a core-shell fine particle according to claim 1, wherein the monomer having the atom transfer radical polymerization initiating group is 2-bromoisobutyric acid-4-vinylphenyl ester or 1-(1-bromoethyl)-4-vinylbenzene.

9. The method for producing monodispersed crosslinked fine particles according to claim 2, wherein the monomer having the atom transfer radical polymerization initiating group is 2-bromoisobutyric acid-4-vinylphenyl ester or 1-(1-bromoethyl)-4-vinylbenzene.

* * * * *